WORKHEAD POSITIONING MEANS

Original Filed Jan. 15, 1968 3 Sheets-Sheet 1

United States Patent Office

Re. 27,604
Reissued Mar. 20, 1973

27,604
WORKHEAD POSITIONING MEANS

John Kenneth Stewart and Helmuth Rolf Erich von Beckmann, Columbia, S.C., assignors to Canron Limited-Canron Limitee Original No. 3,504,635, dated Apr. 7, 1970, Ser. No. 698,001, Jan. 15, 1968. Application for reissue May 10, 1971, Ser. No. 142,083
Int. Cl. E01b *27/16*
U.S. Cl. 104—12 8 Claims

Matter enclosed in heavy brackets [ ] appears in the original patent but forms no part of this reissue specification; matter printed in italics indicates the additions made by reissue.

ABSTRACT OF THE DISCLOSURE

A railway track tamping machine having a fixed tamping head mounted on the chassis of the machine and a second tamping head mounted on the chassis of the machine behind the fixed tamping head and movable longitudinally of the chassis relative to the fixed tamping head, is provided with a detector which detects a first index on the track related to a first tie to be tamped and initiates a control means to control the forward travel of the vehicle to position the fixed head over the first tie to be tamped; and a second detector which detects a second index related to a second tie to be tamped and initiates a control means to actuate a motor on the vehicle to move the second tamping head on the chassis relative to the first tamping head to position the second tamping head over the second tie to be tamped.

Background of the invention

This invention relates to devices for positioning workheads on railway maintenance of way machines and, particularly, to means for positioning movable tamping heads on a tamping machine so as to locate individual heads above the particular ties to be tamped by each head.

In the past, tamping machines have been provided with a fixed tamping head at the leading end of the tamping machine and with a tamping head mounted for movement on the frame of the machine towards and away from the leading tamping head. Also, heretofore, tamping machines have been provided which had two sets of tamping heads longitudinally movable relative to one another on the frame of the tamping machine. These types of configuration enabled one tamping head to tamp one set of ties and the second tamping head to be positioned relative to the first tamping head and to tamp a further set of ties. Previously, the operation of positioning the tamping heads on the machines so as to ensure that they tamp the particular tie required, has been effected by the tamping machine operator. With the trend towards more fully automated tamping machines, it has become desirable to provide a tamping machine with multiple tamping heads and automatic means for correctly positioning those heads above the pre-selected tie to be tamped.

Summary of the invention

Accordingly, the present invention provides means responsive to a first index referenced to a first tie to be tamped by a first tamping head to control the positioning of said first tamping head in relation to said tie to be tamped and means responsive to a second index referenced to a second tie to be tamped by a second tamping head to control the positioning of said second tamping head relative to said second tie to be tamped.

It is to be understood that the invention is also applicable to the positioning of workheads other than tamping heads. For example, the invention could be used, if desired, to position a spike puller, a spike hammer, or the like.

According to a preferred embodiment of the invention, a track travelling vehicle is provided with a fixed leading tamping head mounted on the chassis of the vehicle and a second tamping head movable on the chassis of the vehicle, longitudinally thereof, relatively to the first tamping head, control means operable in response to the detection of a first index related to a first tie to be tamped to control the forward travel of the vehicle so as to position the leading head over the first tie to be tamped and a second control means responsive to the detection of a second index related to a second tie to be tamped and operable to actuate means on the vehicle to position the second tamping head over the second tie to be tamped.

Conveniently, the first and second indices may be spots of paint placed on alternate rails to mark the individual ties to be tamped and the control means may include detectors in the form of a transmitting light and a photoelectric cell.

In one embodiment in accordance with the invention, the second tamping head may be mounted on rollers for movement longitudinally of the chassis and driven by hydraulic piston and cylinder means from a positive displacement pump operatively connected to the wheels of the vehicle and controlled by the second control means.

According to a preferred embodiment of the invention the means responsive to a first index is a counting circuit actuated by a tie sensing switch and the means responsive to the second index is a second counting circuit actuated by a second tie counting switch.

Brief description of the drawings

The following is a description by way of example of certain embodiments of the present invention, reference being had to the accompanying drawing which is diagrammatic part side elevation of the front portion of a tamping machine and a satellite car.

Description of the preferred embodiments

Figures 1, 5:
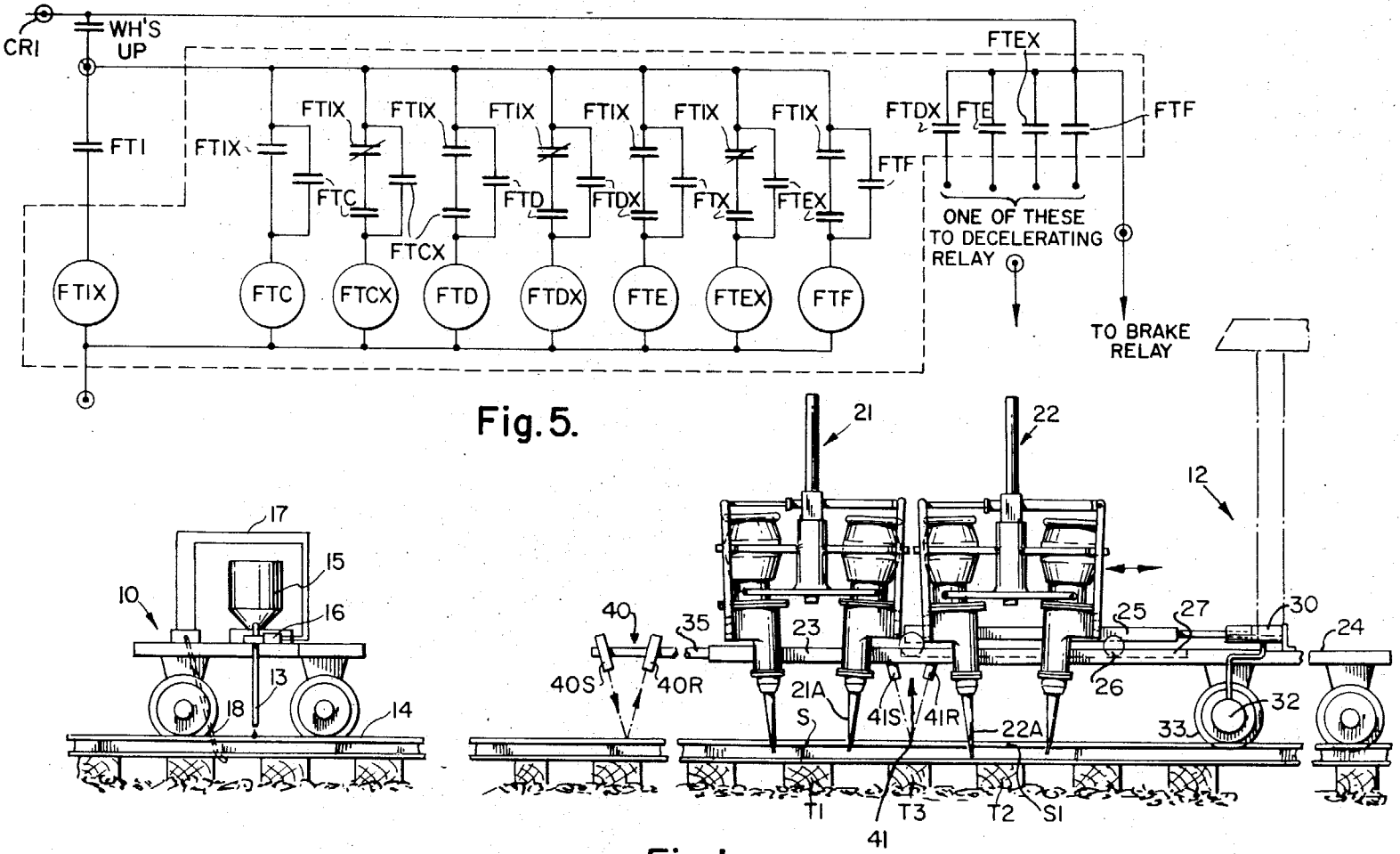
FIGURE 1 is a diagrammatic part side elevation of the front portion of a tamping machine and a satellite car.
FIGURE 5 is a counting circuit associated with the leading tie indexing switch.
Figure 2:
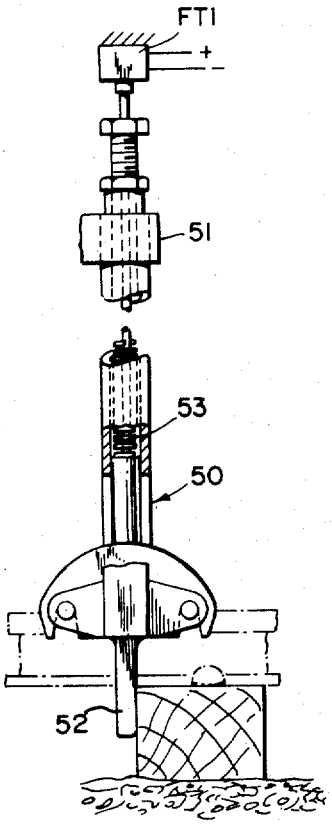
FIGURE 2 is a detail of a tie indexing switch in the between tie position.

A satellite car 10 precedes a tamping machine 12 and is provided with paint applicators 13, one above each rail 14 of the track, fed by paint under pressure from can 15 through solenoid operated valves 16. The satellite car may take any suitable form, for example, it may be an inspection car which precedes the tamping car by perhaps several hours, the operator manually operating the solenoid valves 16 to apply a paint spot to a selected one of the rails. Alternatively, the satellite car 10 may be a car associated with the tamping machine 12 (for example, it may be a satellite car carrying light projectors for a surveying system) and merely precedes the tamping machine by say, 100 feet. In such a circumstance, the valves 16 could be operated automatically by any suitable measuring device, say a stopping switch, diagrammatically indicated at 18, which measures the number of tie passed and, at the appropriate point, provides an electrical signal which through line 17 operates valve 16 and releases a spot of paint on the rail. When it is desired to tamp alternate rails, the right hand applicator may be arranged to operate to provide a paint spot on the right hand rail referenced to every "even" tie and the left hand applicator may be arranged to provide a paint spot on the left hand rail referenced to every "odd" tie. The leading tamping head 21 is shown fixed to a forwardly extending frame 23 of the vehicle chassis 24 and the trailing head 22 is mounted on a sub-frame 25 carrying external rollers 26 which run in longitudinally extending tracks 27 in the frame 23 of the chassis 24. The head 22 is driven backwards and forwards in the tracks 27 by a motor means, say a hydraulic piston and cylinder arrangement 30 connected to a positive displacement pump 32 mounted on the [front] *rear* wheels 33. In operation, the leading tamping head 21 tamps the tie T1 therebeneath and the head 22 tamps the tie T2 therebeneath, the unit 21A of tamping head 21 combining with unit 22A of tamping head 22 to tamp the tie T3. Such a tamping system is disclosed in detail in my copending application No. 567,637, filed July 25, 1966, *now Pat. No. 3,343,497, issued Sept. 26, 1967.* With a tamping system such as that shown, the applicator would provide paint spots S, S′ on alternating rails at every third tie.

Two *control means including* detector devices 40 and 41 are provided on the machine 12, the detector device 40 being mounted on a longitudinally telescopic portion 35 of the frame 23 and the detector device 41 being mounted on an extension arm 42 of the sub-frame 25. The detector 40 is associated with the tamping head 21 and the detector 41 is associated with the tamping head 22. The detectors are located immediately above the rails, the detector 40 being over the right hand rail and the detector 41 being over the left hand rail or vice versa. The detectors each comprise a small light source 40S, 41S which project a spot of light onto the rail from whence it is reflected into its associated photoelectric cell 40R, 41R. As a first spot of paint S referenced *to* the tie T1 is encountered by the spot of light from the light transmitter 40S, the light intensity received at the photoelectric cell 40R changes and a command signal is created which is amplified in an amplifier forming part of a control circuit, which in turn actuates solenoid controlled hydraulic valves to apply hydraulic brakes to stop the tamping vehicle 12 with the first tamping head 21 located above the first tie T1 to be tamped. Similarly, when the detector 41 detects a spot of light on the other rail, a command signal is transmitted to a valve of the positive displacement pump 32 which, as has already been said, is directly mechanically coupled to the wheel 38 of the vehicle and is hydraulically connected to the piston and cylinder attachment 30 to adjust the position of the second tamping head 22 above the second tie T2 to be tamped.

The fact that the pain spots are located directly in line with the tie to be tamped requires that the leading detector 40 be spaced ahead of the tamping head 21 by a distance sufficient to permit the machine to be decelerated by brake application and brought to a halt after detection of the paint spot and application of the brakes. The telescopic portion 35 of the frame 23 permits the leading detector 40 to be moved farther away from or closer to the front tamping head 21 to allow for up-grades or downgrades of the track. Alternatively, of course, the detectors 40 and 41 could be arranged immediately beneath the tamping heads 21 and 22, in which case the index paint spots would have to be applied sufficiently uptrack of the vehicle to permit the necessary time for deceleration after detection of the spot S associated with the particular tie T1 to be tamped.

In one mode of operation, in travel between tamping operations, the sub-frame 25 may be moved, as shown in the drawing, to the left against a stop on the chassis under the action of, for example, springs. The stop is located such that the distance between the two tamping heads 21, 22 in the track travelling position is less than the spacing they will occupy when tamping the track. For this reason, the detector on the carriage of the rear tamping heads will detect its index before the detector for the front tamping head will detect its index. The rate of operation of the positive displacement pump [33] *32* may be related to the stroke of the motor 30 so that as soon as the trailing detector 41 detects its index, the positive displacement pump 32 is driven from the front wheel 33 to actuate the motor 30 so that the trailing head 22 remains over the tie T2 to be tamped by moving rearwardly at the same rate as the machine 12 proceeds forward.

Alternative modes of operation are clearly possible within the ambit of the invention. For example a machine could be arranged to operate such that on the completion of a tamping operation a suitable motor, for example a spring, could propel the head 22 rearwardly to the end of its tracks where a stop would be encountered, and in this instance the spacing between the head 21 and the spacing of the head 22 in its rearmost position would be greater than the spacing that would exist during the tamping operation, so that when the first detector senses the front tie in addition to originating a braking operation a command signal could be sent to the cylinder 30 to move the tamping head 22 forward until such time as the second detector 41 encounters its reference spot S1.

Again, and yet a further alternative the head 22 could "float" about the middle of its track 27 and if the first detector 40 and the second detector 41 encounter their reference spots S1, S2 at the same time, all that happens is that the machine will be brought to a halt with the heads 21 and 22 over the ties to be tamped. However, if the first head 40 encounters its reference S and the second detector 41 has not yet encountered its detector S′ a command signal is tranmitted to the cylinder 30 to propel the head 22 forwardly until its associated detector 41 encounters it reference spot S′.

On the other hand if the second detector 41 encounters its index S1 before the index S is encountered by the detector 40 then the command signal is provided, in conventional fashion, to the cylinder 30, to move the head 22 rearwardly under the action of the direct displacement pump 32 so that the head 22 maintains station with the tie to be tamped.

It is to be understood of course that the paint spot and the light detector may readily be replaced by a metal tack and a magnetic detector to provide a similar set of commands for the positioning of the heads.

Referring now to FIGURES 2 through 6 of the drawings, according to the embodiment shown in these figures of drawings, the detectors 40 and 41 are each replaced by a tie indexing switch 50 mounted on the vehicle by means of a vertically telescopic frame 51 which may lift the tie indexing switches out of contact with the track for track transportation. Each tie indexing switch comprises mainly a tie sensing element 52 pivotally mounted to the switch sleeve 53 and having a cam profiled face 55 and a push rod 57 which is spring urged into engagement with the cam face and which is moved upwardly within the sleeve 55 when the tie sensing element 52 climbs onto a tie and pushes against a microswitch FTI for the front tie and RTI for the other tie.

Figure 3:
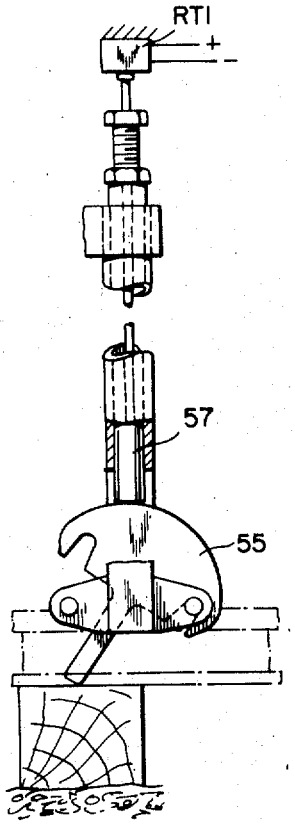
FIGURE 3 is a view similar to FIGURE 2 but with the switch engaging the top of a tie.
Figure 4:
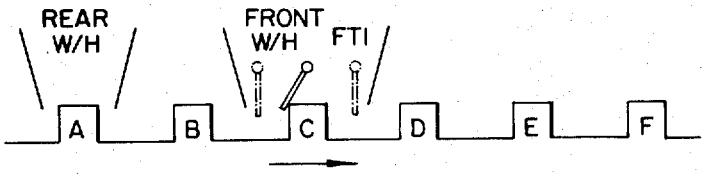
FIGURE 4 is a detail showing the switch operation.
Figure 6:
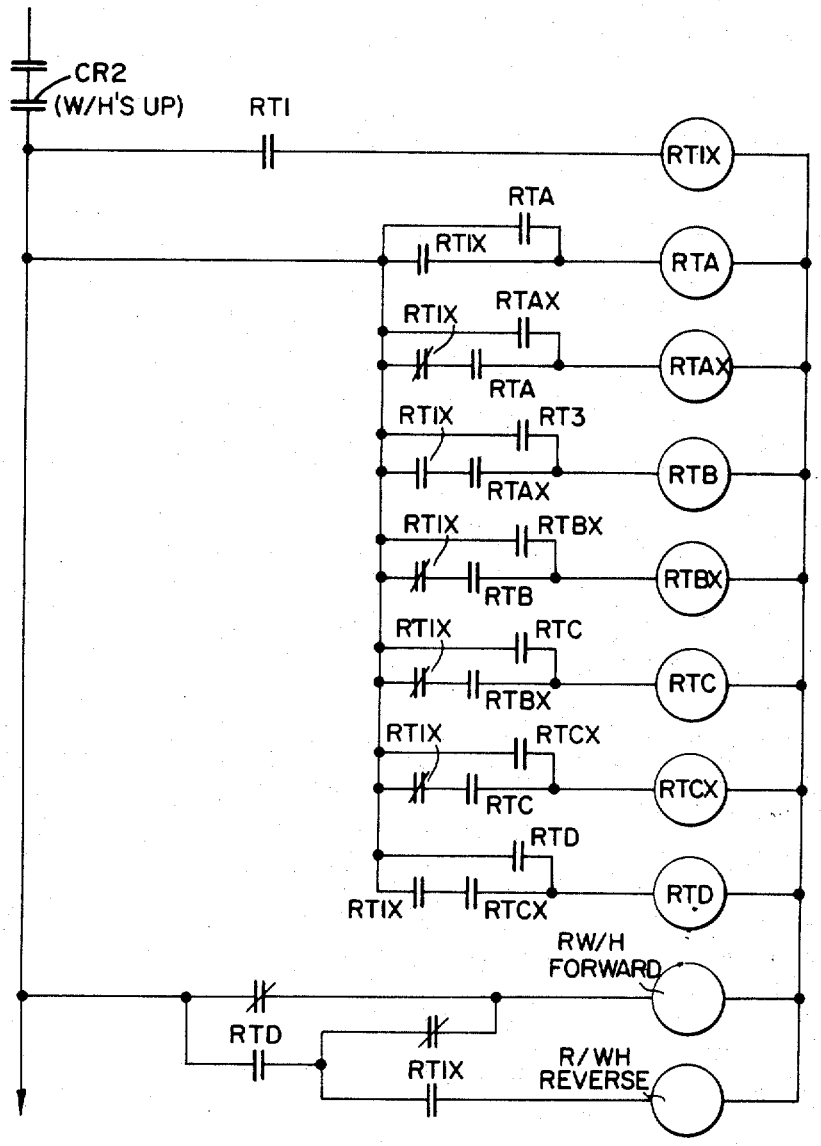
FIGURE 6 is a schematic arrangement of a counting circuit associated with a trailing tie indexing switch.

The microswitch FTI on the front tie sensing element operates a front tie auxiliary FTIX (FIGURE 5) and the microswitch RTI on the trailing sensing element operates a rear tie auxiliary relay RTIX (FIGURE 6) which relays, in turn, drive a sequence of counting relays (FIGURES 5 and 6). The counting relays act in conventional fashion. For example with reference to FIGURE 5 the sequence is as follows assuming a starting position as seen in FIGURE 3:

When the workheads are up clear of the ballast in the transportation position they close a switch which closes contacts CR1 for the front head and CR2 for the rear head. The front tie sensing element 52 on encountering a tie closes contacts FTIX which energizes relay FTC and this relay holds in. Relay FTC (for tie C see FIGURE 4) also provides a path for FTCX to energize as the machine moves forward and the front tie sensing element 52 leaves the tie and FTI opens. When FTCX energizes and seals in, this indicates that the machine has moved over the first tie FTC (see FIGURE 3). Then FTI closing at tie D energizes relay FTD. The front tie sensing element 52 coming off tie D provides a signal that the machine is almost half way to the tie (F) where it must be stopped to tamp. When FTDX is energized it will energize, after an adjustable time delay, a relay (not shown) which is the "decelerate" relay. However counting continues until FTF energizes which applied the vehicle brakes by means of a further relay (not shown) and the workheads are fed downwardly. The downfeed of the workhead clears the counting circuit.

In a preferred arrangement the longitudinal placement of the front indexer (52) is such that when it comes off tie F, the tools are in the correct working position. This action of the indexer (52) allows downfeed of the workhead. Should the machine stop with the indexer on tie F, an automatic jogging circuit (not shown) inches the machine forward until the front indexer 52 comes off the tie, and again, downfeed is allowed.

A third indexer (not shown) may be placed forward of the front indexer 52 and used to sense "overshoot"; i.e., that the machine has gone too far forward. Conventional control circuitry (not shown) may be provided to block downfeed and provide an alarm, and/or automatically jog the machine in reverse until this "overshoot" indexer comes back off the tie ahead of tie F. The placement longitudinally of this third and leading indexer may be made adjustable to an extent necessary to accommodate extreme tie spacing variations. However, within the tie-spacing variation tolerated by the relative position of the working tools, this third indexer would serve its purpose without adjustment.

Either or both "undershoot" and "overshoot" conditions can be used to initiate correction in the acceleration and braking rates of the machine in order to preclude recurrence of the condition.

Counting for the rear tie sensing element 52 is similar to the aforementioned counting except that when the workheads are in the "up" position the hydraulic piston and cylinder arrangement 30 (which in this embodiment is not connected to displacement pump) forces the workhead 22 forwardly against a forward stop. When the final count relay RTD is closed by the rear tie sensing element 52 contacting tie D, control is transferred to the rear tie index sensing element 52 which initiates "hunting" over tie D. That is to say, when RTI brakes, the rear workhead reverses and when RTI opens the rear workhead goes forward. Hunting continues until the workheads downfeed.

As with the other methods of operation described in connection with the paint spot embodiment it will be clear that the counting circuits could be arranged such that the rear workhead is left at approximately the correct spacing from the front workhead until the brakes are applied then if the rear sensing element 52 senses a tie the rear workhead reverses as it downfeeds until the sensing element opens RTI; or if the element 52 senses the absence of a tie, the rear workhead moves forward under the action of piston and cylinder arrangement 30 until the rear does sense a tie. That is to say, the rear indexing system adjusts, if necessary, the rear workhead on reaching the new work site.

Similarly also of course the adjustment of the rear workhead could depend upon the sequence in which the two fingers sense the final tie.

Also, it may be desirable to provide an interlock between the two counting circuits such that the workheads will not be lowered until such time as both counting circuits have counted the appropriate number of ties.

It will be clear that any suitable counting circuit could be used for example a stepping switch or a solid state circuit could be used.

It is extremely advantageous however to arrange the circuitry such that the front tie sensing element senses the presence or absence of the tie. That is to say, with reference to FIGURE 3, if the front tie element 53 has sensed tie C and the machine has come to a halt with the front tie sensing element 52 resting upon tie C, then FTC will be closed. However, if the machine stops and then slides back FTC opens again and the tie is not counted until the machine starts forward once more.

What we claim as our invention is:

1. A track traveling vehicle having a fixed leading tamping head mounted on the chassis of the vehicle and a second tamping head mounted for longitudinal movement in said chassis relative to said first tamping head under the action of its own motor means; first control means operable in response to the detection of a first index referenced to a first tie to be tamped to control the forward travel of the vehicle so as to position the leading tamping head over the said first tie; and a second control means [,] movable with said second tamping head *and* responsive to the detection of a second index referenced to a second tie to be tamped and operable, if the first control means has not already operated, to actuate the motor means to drive the second tamping head rearwardly on said chassis as the vehicle moves forward to lock the second tamping head on to said second tie; said first control means operating [, if said second control means has not already operated,] to stop the forward travel of the vehicle and, *if said second control means has not already operated,* to actuate said motor means to drive the second tamping head forwardly on said chassis to hunt for said second tie.

2. Apparatus as claimed in claim 1 in which the motor means comprises a hydraulic piston and cylinder arrangement; a positive displacement pump operatively connected to at least one wheel of the vehicle, fluid connections between said positive displacement pump and said piston and cylinder arrangement.

3. Apparatus as claimed in claim 1 in which the control means includes detectors comprising a light source and a photoelectric cell receiver adapted to receive the reflected beam off the track from the light source whereby when said first and second indices comprise paint spots placed on alternate rails, marking the individual ties to be tamped, the photoelectric cell detects a change of intensity in reflected light and provides positioning signals for the heads, at least one of said detectors being positionally adjustable longitudinally of said chassis.

4. A machine as claimed in claim 1 in which the means responsive to the first index is a counting circuit actuated by a tie sensing switch and the means responsive to the second index is a second counting circuit actuated by [a second counting circuit actuated by] a second tie counting switch.

5. A track travelling vehicle having a fixed leading head mounted on the chassis of the vehicle and a second tamping head mounted for movement on the chassis of the vehicle longitudinally thereof relatively to the first tamping head; a first tie sensing switch depending from the vehicle into track contact electrically connected to a first tie counting circuit adapted to control the forward travel of the vehicle in response to the counting of ties so as to positioning the leading head over the first tie to be tamped; a second tie sensing switch depending from the vehicle into track contact electrically connected to a second tie counting circuit adapted to control means to position the second tamping head over the second tie to be tamped in response to the counting of a predetermined number of ties.

6. Apparatus as claimed in claim 5 wherein said first tie counting circuit operates after the counting of a predetermined number of ties to decelerate the vehicle and after the counting of a further predetermined number of ties to apply braking means.

7. Apparatus as claimed in claim 5 in which said first tie counting circuit is adapted to cooperate with said first tie sensing switch such that said first tie sensing switch senses the presence or absence of a tie.

8. Apparatus as claimed in claim 5 in which said first tie counting circuit and said second tie counting circuit are interlocked to prevent operation of the tamping heads until both counting circuits have counted the appropriate number of ties.

References Cited

The following references, cited by the Examiner, are of record in the patented file of this patent or the original patent.

UNITED STATES PATENTS

| | | | |
|---|---|---|---|
| 2,734,463 | 2/1956 | Hursh et al. | 104—12 |
| 3,343,497 | 9/1967 | Stewart | 104—12 |
| 3,362,348 | 1/1968 | Doorley et al. | 104—1 |
| 3,401,642 | 9/1968 | Fisher | 104—7 |

FOREIGN PATENTS

| | | |
|---|---|---|
| 793,377 | 4/1958 | Great Britain. |

DRAYTON E. HOFFMAN, Primary Examiner

R. A. BERTSCH, Assistant Examiner

U.S. Cl. X.R.

104—17 R